United States Patent [19]

Muranaka et al.

[11] 4,009,425
[45] Feb. 22, 1977

[54] CAPACITOR WITH INTERSECTING LEAD PLATES

[75] Inventors: Takayoshi Muranaka, Moriguchi; Hajime Yoneda, Uji; Yoshio Miyazaki, Hirakata, all of Japan

[73] Assignee: Matsushita Electric Industrial Co., Ltd., Osaka, Japan

[22] Filed: Feb. 12, 1976

[21] Appl. No.: 657,644

[30] Foreign Application Priority Data

Feb. 14, 1975 Japan ............................. 50-19248

[52] U.S. Cl. .................. 317/230; 361/307
[51] Int. Cl.² ......................................... H01G 9/00
[58] Field of Search .................. 317/230, 231, 242; 29/570, 25.41, 25.42; 339/152, 275 A, 277 C, 278 A; 136/135 R

[56] References Cited

UNITED STATES PATENTS

| | | | |
|---|---|---|---|
| 3,346,783 | 10/1967 | Millard | 317/242 |
| 3,593,066 | 7/1971 | Norman, Sr. | 317/242 |
| 3,654,524 | 4/1972 | Puppolo et al. | 317/230 |
| 3,822,397 | 7/1974 | Puppolo et al. | 317/230 |

Primary Examiner—Michael J. Lynch
Assistant Examiner—James W. Davie
Attorney, Agent, or Firm—Stevens, Davis, Miller & Mosher

[57] ABSTRACT

An electrolytic capacitor comprises a pair of lead plates of electrically conductive metal electrically isolated from each other and arranged to intersect perpendicularly to each other, and a plurality of divided capacitor elements connected to said lead plates to attain a low equivalent series resistance and a high ripple performance, whereby the electrolytic capacitor is adapted to be satisfactorily used at a high frequency range.

6 Claims, 24 Drawing Figures

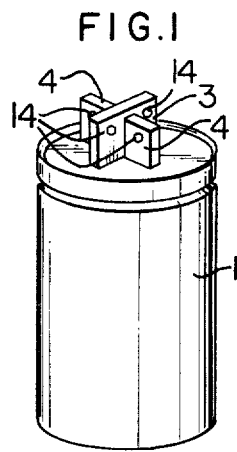
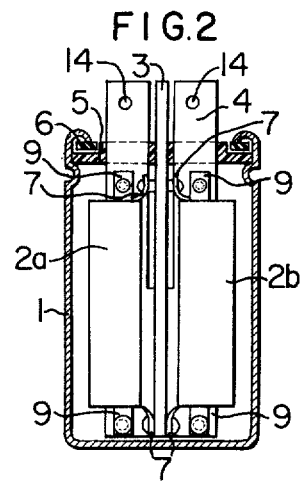
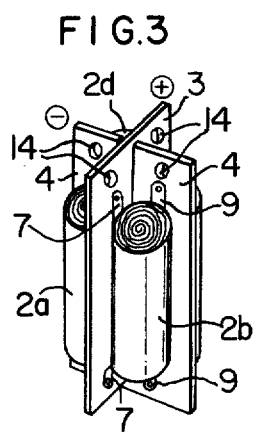
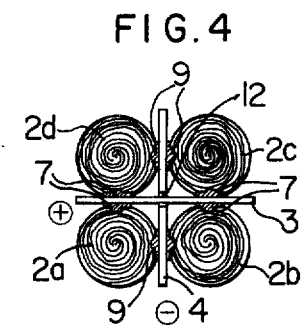
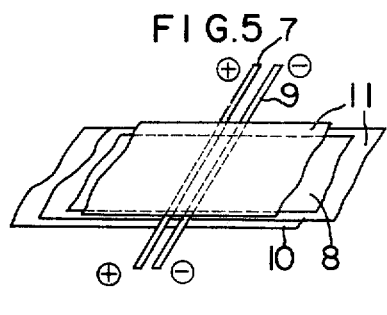
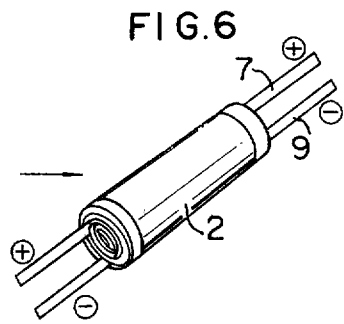

FIG.7
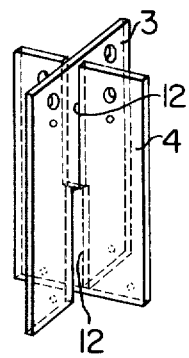
FIG.8a
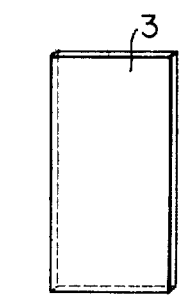
FIG.8b
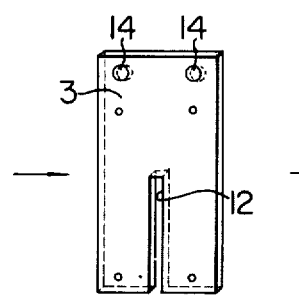
FIG.8c
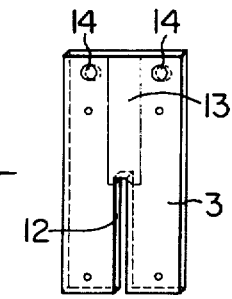
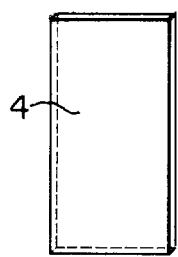
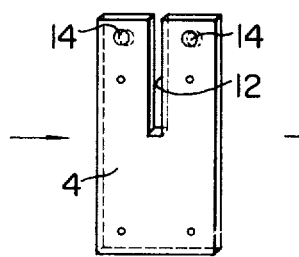
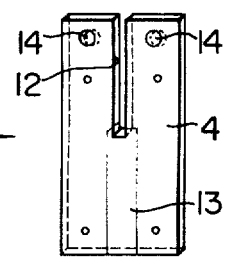
FIG.9
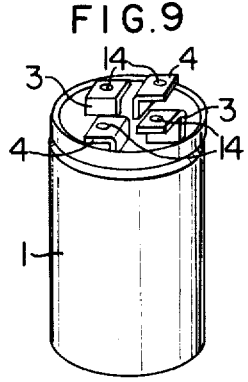

CAPACITOR WITH INTERSECTING LEAD PLATES

BACKGROUND OF THE INVENTION

1. Field of the Invention

The present invention relates to an electrolytic capacitor having a low equivalent series resistance and a low impedance capable of being satisfactorily used at a high frequency range.

2. Description of the Prior Art

The use of an electrolytic capacitor in a filter for a D.C. power supply has often been observed.

A high frequency control system such as a switching type D.C. power supply has been recently used frequently. Particularly, at a low voltage and high power D.C. power supply, an electrolytic capacitor of a high capacitance is required. Since such an electrolytic capacitor uses a long anode foil and a long cathode foil, it exhibits a high inductance at a high frequency and cannot present a sufficient filtering action, and hence the improvement of its characteristic has been strongly desired.

SUMMARY OF THE INVENTION

An electrolytic capacitor capable of being used at the high frequency must have a sufficiently low equivalent series resistance to reduce power loss due to a large ripple current which flows at a low frequency and to suppress heat generation, and at the same time it must have a sufficiently low inductance to assure sufficient filtering action at a high frequency.

An object of the present invention is to provide an electrolytic capacitor which meets the above requirements for use at the high frequency, is a cheap and easy manner.

The present invention is directed to an electrolytic capacitor wherein capacitor elements each comprising an anode foil, a separator and a cathode foil laminated one on the other and wound, are used to eliminate the instability of interelectrode spacing and the inefficiency in operability which have been encountered in a stacked foil type capacitor while maintaining a low equivalent series resistance resulting from the multiplicity of leads which is a merit of the stacked foil type capacitor, four such capacitor elements being used, and is order to enhance ripple performance and improve high frequency characteristic, a pair of lead plates which serve as leads to the anode and cathode, respectively, are arranged to intersect perpendicularly to each other and said four capacitor elements are arranged at the four corners defined by said lead plate pair, the leads of the capacitor elements being connected to said lead plates, and the resultant capacitor elements are then impregnated with electrolyte and sealed in a casing. The above and other objects, features and advantages of the present invention will become more apparent from the following detailed description of the preferred embodiments of the invention when taken in conjunction with the accompanying drawings.

BRIEF DESCRIPTION OF THE DRAWINGS

FIG. 1 is a perspective view of one embodiment of an electrolytic capacitor of the present invention.

FIG. 2 is a sectional view thereof.

FIG. 3 is a perspective view of an elementary unit thereof.

FIG. 4 is a top plan view of the elementary unit.

FIG. 5 is a developed view of a capacitor element.

FIG. 6 is a perspective view of the capacitor element.

FIG. 7 is a perspective view showing an assembly of lead plates.

FIGS. 8A to 8C illustrate manufacturing steps of the lead plates.

FIG. 9 is a perspective view of another embodiment.

DESCRIPTION OF THE PREFERRED EMBODIMENTS

Figure 10:
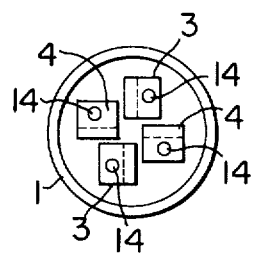
FIG. 10 is a top plan view thereof.

One embodiment shown in FIGS. 1 through 8 is first explained.

Housed in a casing 1 formed by a metal such as aluminum are four divided capacitor elements 2a, 2b, 2c and 2d, which are mounted at four corners defined by an anode lead plate 3 and a cathode lead plate 4 coupled to intersect perpendicularly to each other. At the tops of the lead plates 3 and 4, a sealing member 5 made of resin is fastened, which is sealingly attached to an opening of the casing 1 via a rubber packing by means of contraction and bending. Those upper portions of the lead plates 3 and 4 which extend above the sealing member 5 are used as external terminals.

The capacitor element 2 comprises, as shown in FIG. 5, an anode foil 8 of aluminum having an anode internal lead 7 attached thereto so that it extends in the direction of width of the anode foil 8, and a cathode foil 10 of aluminum having a cathode internal lead 9 attached thereto in the same way. The anode foil 8 and the cathode foil 10 are stacked on each other with a separator 11 being interposed therebetween, and the lamination are wound to form a wound element as shown in FIG. 6. The anode internal lead 7 and the cathode internal lead 9 extend beyond the opposite ends of the capacitor element 2.

The lead plates 3 and 4 are constructed by plates of aluminum or the like, as shown in FIG. 8. Slits 12 having width wider than thickness of the lead plates 3 and 4 are formed, on the one hand in the lead plate 3 extending from an intermediate point to the bottom end thereof and on the other hand in the lead plate 4 extending from an intermediate point to the top end thereof. Insulating layers 13 are formed on center zones of the lead plates 3 and 4 except in the area of the slit 12, and the lead plates 3 and 4 are assembled to intersect perpendicularly to each other as shown in FIG. 7 by making use of the slits. When the lead plates 3 and 4 are assembled to intersect perpendicularly to each other, they are electrically isolated from each other by virtue of the slits 12 and the insulating layers 13. The insulating layers 13 should be formed at the inner deepest portions of the slits 12 which cross to each other.

By perpendicularly assembling the lead plates 3 and 4 in this manner, four corners are defined, at which the capacitor elements 2a, 2b, 2c and 2d are arranged. The anode internal leads 7 and the cathode internal leads 8 of the capacitor elements 2 are coupled to the lead plates 3 and 4, respectively, by means of welding or caulking using rivets.

In the state of assembling as shown in FIGS. 3 and 4, the capacitor elements 2 are impregnated with electrolyte and the assembly is sealed in the casing 1.

Connecting apertures 14 for external lead wires are formed at the upper ends of the lead plates 3 and 4.

Figure 11:
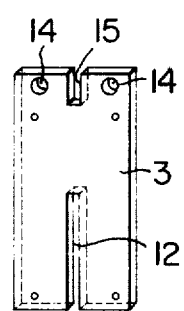
FIG. 11 is a perspective view of a lead plate used in the capacitor of FIG. 9.

Alternatively, the upper end of the lead plate 3 may be formed with a notch 15 as shown in FIG. 11, and the lead plate is mounted so that the upper end thereof extends above the sealing member 5 and the upper end is bent to present the external terminals as shown in FIGS. 9 and 10.

Figure 12:
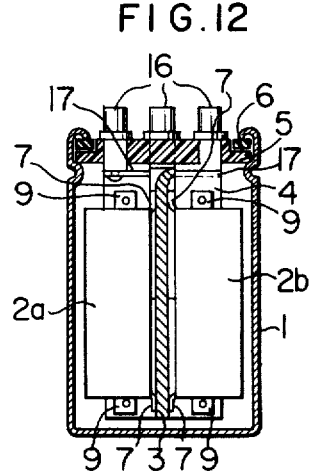
FIG. 12 is a sectional view of other embodiment.
Figure 13:
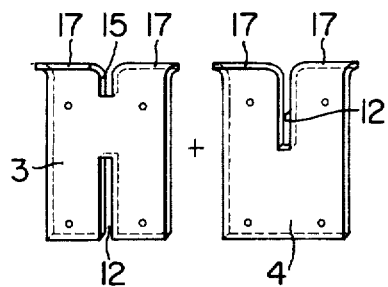
FIG. 13 is a perspective view of lead plates used in the capacitor of FIG. 12.
Figure 14:
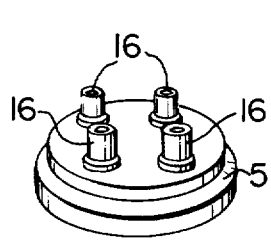
FIG. 14 is a perspective view of a sealing member for the capacitor of FIG. 12.

Referring now to FIGS. 12 to 14, when the sealing member 5 having external terminals 16 inserted therein is used, the notch 15 is formed at the top of the lead plate 3 so that both lead plates 3 and 4 can be divided into two sections at their respective upper ends, and the tops of the lead plates 3 and 4 are bent to form bends 17, to which the external terminals 16 may be electrically and mechanically connected by means of welding or caulking using rivets.

Figure 15:
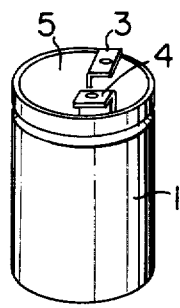
FIG. 15 is a perspective view of still other embodiment.
Figure 16:
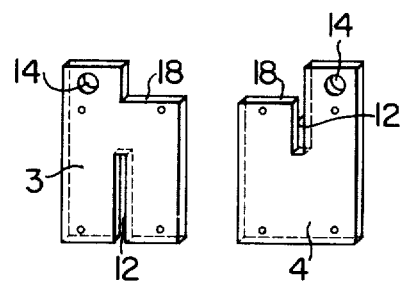
FIG. 16 is a perspective view of lead plates used in the capacitor of FIG. 15.

When it is desired to form only two external terminals as shown in FIG. 15, cutouts 18 are formed at portions of upper ends of the lead plates 3 and 4 while the remaining portions thereof extending above the sealing member 5, and the extending portions being thereafter bent to form the external bent terminals. When it is desired to form two terminals on each of the opposite ends of the casing 1, cutouts 18 are formed at upper and lower ends of the lead plates 3 and 4 and the remaining end portions are arranged to extend beyond the opposite ends of the casing.

Figure 17:
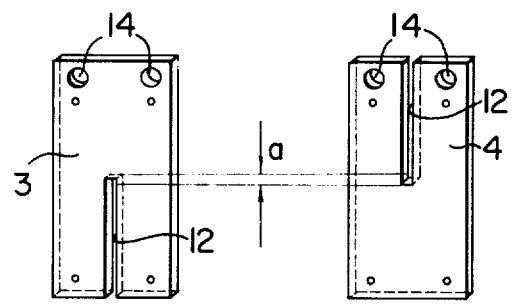
FIG. 17 is a perspective view of lead plates in other embodiment.

Furthermore, in order to enhance the insulation at the inner deepest crossing areas of the slits 12 of the lead plates 3 and 4, the slits 12 may be formed longer as shown in FIG. 17 so that a gap having a width a is presented between the end surfaces of the slits 12 when the upper ends of the lead plates are held by the sealing member 5.

Figure 18:
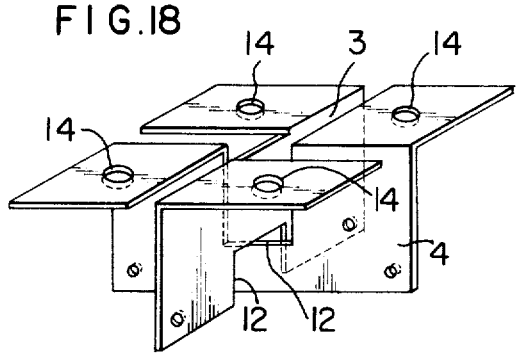
FIG. 18 is a perspective view showing an assembly of the lead plates in the other embodiment.
Figure 19:
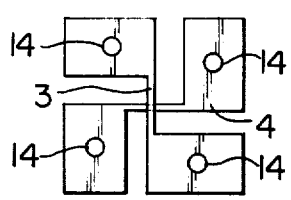
FIG. 19 is a top plan view thereof.
Figure 20:
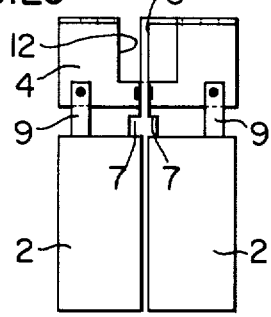
FIG. 20 is a sectional view showing the mount of capacitor elements.

Alternatively, as shown in FIGS. 18 through 20, instead of mounting the capacitor elements 2 on the lead plates 3 and 4, the lead plates 3 and 4 may be arranged to intersect perpendicularly to each other only at the upper portions of the capacitor elements 2 or at the area of the sealing member, and any number such as two, three, four, five, six, . . . of the capacitor elements 2 may be connected to the lead plates 3 and 4.

Figure 21:
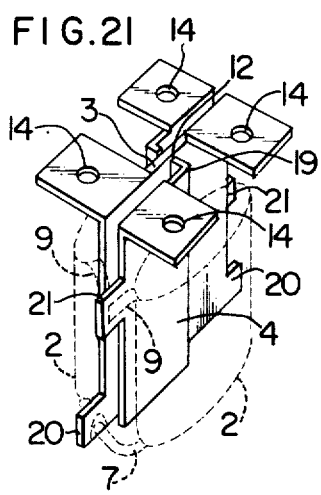
FIG. 21 is a perspective view showing a combination of lead plates in other embodiment.

Referring to FIG. 21, the lead plate 4 is provided with a bend 19 at its intermediate area with the bend 19 perpendicular to the lead plate 3 while the other portion of the lead plate 4 is in parallel with the lead plate 3, to allow mounting of two capacitor elements 2. Lugs 20 to which the anode internal leads 7 of the capacitor elements 2 are connected are formed at opposite lower ends of the lead plate 3 while lugs 21 to which the cathode internal lead 9 of the capacitor elements 2 are formed at opposite upper ends of the lead plate 4. In this manner large size of capacitor elements 2 may be used to form a small size electrolytic capacitor and the manufacture of the capacitor elements 2 is facilitated.

A specific example of the present invention is given below.

The anode foil 8 and the cathode foil 10 are made of high purity aluminum, and the anode foil 8 is formed at a predetermined voltage to form an oxide coating thereon in the same manner as in the prior art. The cathode foil 10 may also be subjected to formation to make it non-polarized.

The thickness of the foils is in the order of 0.02 to 0.1 mm. The separator 11 is made of a kraft paper or manila paper of 0.02 to 0.1 mm thickness.

The anode foil 8 is sized to have the width of 82 mm and the length of 500 mm, to which the anode internal lead 7 is attached. On the anode foil 8, two separators 11 in the form of tape having 86 mm width and the cathode foil 10 of 82 mm width and 500 mm length having the cathode internal lead 9 attached thereto are stacked and the resulting lamination is wound to form the capacitor element 2.

Four such capacitor elements 2 are prepared. On the other hand, the lead plates of 40 mm × 140 mm made of high purity aluminum of 15 mm thickness are formed in a manner shown in FIG. 8, which lead plates are then assembled in a manner shown in FIG. 7 and the sealing member 5 is mounted thereon to form an integral unit. The internal leads 7 and 9 of the capacitor elements 2 are welded to the lead plates 3 and 4 to complete the elementary unit shown in FIGS. 3 and 4. A tape or the like is wound thereon to fasten the assembly, which is then impregnated with electrolyte and housed in the casing 1 and the sealing member 5 is sealed thereto via the packing 6 by contracting or bending the casing 1.

In this manner, an electrolytic capacitor of 16 Volts, 60,000 μF was provided.

The below list gives a comparison of the characteristics of the present electrolytic capacitor, a prior art wound electrolytic capacitor and a stacked foil electrolytic capacitor.

|  | Capacitance | Loss | Packing Index |
|---|---|---|---|
| Prior Art (Wound type) | 60,000 μF | 400 Ω μF | 1 |
| Prior Art (Stacked foil type) | 60,000 μF | 200 Ω μF | 2.3 |
| Present invention | 60,000 μF | 200 Ω μF | 1.5 |

Figure 22:
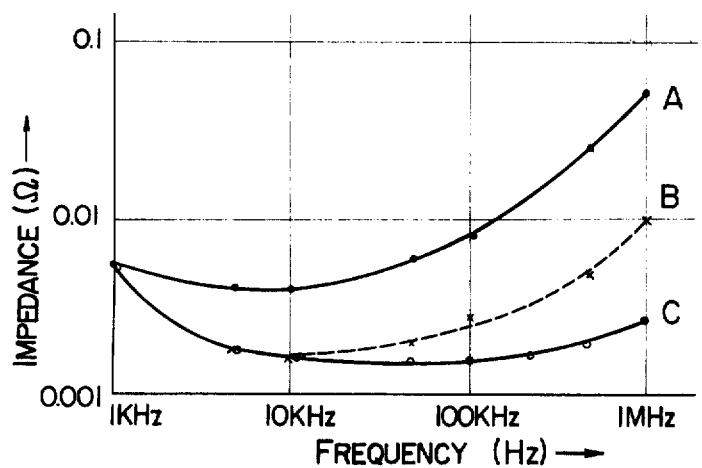
FIG. 22 shows a comparison of frequency-impedance characteristic of prior art and present electrolytic capacitors.

The frequency-impedance characteristics of those products are shown in FIG. 22, wherein A, B and C represent those for the prior art wound type, the prior art stacked foil type and the present invention, respectively.

With the construction of the electrolytic capacitor of the present invention described above, the capacitor elements are divided into four so that the number of the internal leads can be increased and the heat dissipation can be easily effected, and consequently the capacitor can withstand a large ripple current and can exhibit a low equivalent series resistance. Furthermore, the perpendicular lead plates are effective in reducing the inductance at the high frequency region (several tens of KHz to several MHz), and the lead may extend in one direction by virtue of the lead plates.

Thus, the present capacitor provides sufficient functions in various respects as an electrolytic capacitor used at high frequency, and it has great industrial value.

What is claimed is:

1. An electrolytic capacitor comprising a pair of lead plates made of conductive metal, one of said lead plates being formed with a slit extending from an intermediate portion to an upper end thereof while the other lead plate being formed with a slit extending from an intermediate portion to a lower end thereof, said pair of lead plates being assembled such that they intersect perpendicularly to each other and they are electrically isolated from each other, and a plurality of capacitor elements each comprising an anode foil and a cathode foil stacked on each other with a separator being interposed therebetween and the lamination being wound, the anodes and the cathodes of said capacitor elements being separately connected to said pair of lead plates, and an outer casing in which said capacitor elements are sealed with said capacitor elements being impregnated with electrolyte.

2. An electrolytic capacitor according to claim 1, wherein said capacitor elements are arranged at four corners defined by said pair of lead plates.

3. An electrolytic capacitor according to claim 1, wherein insulating layers are formed at crossing areas of said pair of lead plates to enhance electrical insulation between said pair of lead plates.

4. An electrolytic capacitor according to claim 1, wherein said pair of lead plates are adapted to provide external terminals.

5. An electrolytic capacitor according to claim 1, wherein said perpendicular lead plate pair is located only at upper portions of the capacitor elements whereby any selected number of capacitor elements can be connected to the lead plates.

6. An electrolytic capacitor according to claim 1, wherein said one lead plate is provided with a bend at the intermediate portion thereof, and intersects perpendicularly with said other lead plate at said bend but it is in parallel with said other lead plate at the portions other than said bend, whereby the capacitor element can be arranged at only two locations.

* * * * *